(12) United States Patent
Chiu et al.

(10) Patent No.: US 9,710,334 B2
(45) Date of Patent: Jul. 18, 2017

(54) AUTOMATIC RESTART SERVER SYSTEM

(71) Applicants: INVENTEC (PUDONG) TECHNOLOGY CORPORATION, Shanghai (CN); INVENTEC CORPORATION, Taipei (TW)

(72) Inventors: Kuo-Shu Chiu, Taipei (TW); Zhong-ying Qu, Shanghai (CN); Tianwen Zhao, Shanghai (CN); Peng Hu, Shanghai (CN); Fangjie Chu, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 186 days.

(21) Appl. No.: 14/609,648

(22) Filed: Jan. 30, 2015

(65) Prior Publication Data
US 2016/0147604 A1    May 26, 2016

(30) Foreign Application Priority Data
Nov. 25, 2014    (CN) .......................... 2014 1 0690101

(51) Int. Cl.
G06F 11/00    (2006.01)
G06F 11/14    (2006.01)
G06F 11/22    (2006.01)
G06F 11/20    (2006.01)

(52) U.S. Cl.
CPC ...... *G06F 11/1417* (2013.01); *G06F 11/2094* (2013.01); *G06F 11/2284* (2013.01)

(58) Field of Classification Search
CPC ............. G06F 11/1417; G06F 11/1438; G06F 11/1441; G06F 11/2284; G06F 11/3031
USPC ...................................................... 714/23, 36
See application file for complete search history.

(56) References Cited

U.S. PATENT DOCUMENTS

| 8,386,764 B2* | 2/2013 | Li ............................. G06F 8/65 713/1 |
| 8,762,782 B2* | 6/2014 | Yin ..................... G06F 11/1417 714/36 |
| 8,909,910 B2* | 12/2014 | Wang .................. G06F 13/4022 713/1 |

(Continued)

FOREIGN PATENT DOCUMENTS

| TW | 200928963 | 7/2009 |
| TW | 200933481 | 8/2009 |

(Continued)

*Primary Examiner* — Elmira Mehrmanesh
(74) *Attorney, Agent, or Firm* — Kirton McConkie; Evan R. Witt

(57) ABSTRACT

A server system is disclosed herein, which comprises a first BIOS (Basic Input/Output System chip, a second BIOS chip, a baseboard management controller (BMC) and a platform controller. In a preset mode, the platform controller is conductively connected with the first BIOS chip through the BMC and the multiplexer so that the server system is activated by the first BIOS chip. Upon detecting a failure of a POST (Power-on self-test) initialization of the first BIOS chip, the BMC transmits a control command to the multiplexer so as to make the platform controller conductively connecting with the second BIOS chip through the BMC and the multiplexer so that the server system is activated by the second BIOS chip.

10 Claims, 1 Drawing Sheet

(56) References Cited

U.S. PATENT DOCUMENTS

| | | | |
|---|---|---|---|
| 8,943,302 B2* | 1/2015 | Ayanam | G06F 8/665 713/1 |
| 9,015,458 B2* | 4/2015 | Wang | G06F 11/1417 713/1 |
| 2005/0204123 A1* | 9/2005 | Lee | G06F 15/177 713/2 |
| 2008/0288764 A1* | 11/2008 | Lu | G06F 9/4405 713/2 |
| 2009/0193242 A1 | 7/2009 | Huang et al. | |
| 2010/0125752 A1* | 5/2010 | Chen | G06F 11/1666 714/6.1 |
| 2011/0179211 A1* | 7/2011 | Li | G06F 8/65 710/306 |
| 2012/0011355 A1* | 1/2012 | Tang | G06F 11/1433 713/100 |
| 2012/0023320 A1* | 1/2012 | Chen | G06F 11/0793 713/2 |
| 2012/0110378 A1* | 5/2012 | Fan | G06F 11/1666 714/15 |
| 2012/0110379 A1* | 5/2012 | Shao | G06F 11/1417 714/15 |
| 2013/0173833 A1 | 7/2013 | Zou et al. | |
| 2013/0318338 A1* | 11/2013 | Lambert | G06F 11/2284 713/2 |
| 2014/0137095 A1 | 5/2014 | Chiu et al. | |
| 2015/0074385 A1* | 3/2015 | Zheng | G06F 8/665 713/2 |

FOREIGN PATENT DOCUMENTS

| | | |
|---|---|---|
| TW | 201207612 | 2/2012 |
| TW | 201327141 | 7/2013 |

* cited by examiner

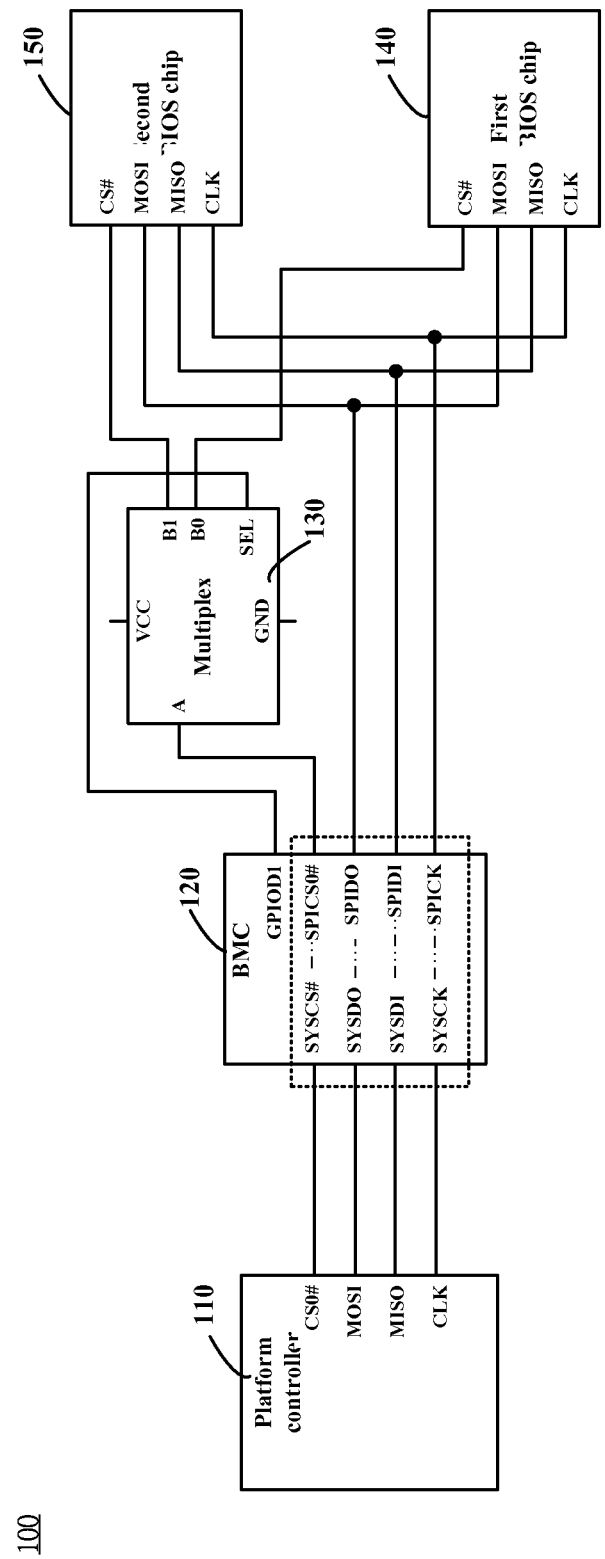

US 9,710,334 B2

AUTOMATIC RESTART SERVER SYSTEM

BACKGROUND OF THE INVENTION

Field of Invention

The present invention relates to a field of servers, and in particular to a server system.

Description of Prior Art

Servers are a very important foundation of internet structure. Usually, BIOS (Basic Input/Output System) is an extremely important module in a server. It is necessary to initialize each hardware device according to settings of the BIOS during startup, and each hardware device is able to be operated after the OS (Operation system) starts working.

So far, most server systems dispose one BIOS chip. When a POST (Power on self-test) is failed, it is necessary to repair or off-line update a firmware of the BIOS chip, which is inconvenient for the user. If another BIOS chip is disposed into the server system, when an initialization of the POST for one of the BIOS chips is failed or the firmware itself is defective, the server system will automatically switch to the other BIOS chip, which allows the sever system startup normally. This is extremely convenient for data centers, and enterprises having many servers. In the prior art, a desktop will adopt the scheme mentioned above; however, manually switching the BIOS chips is required.

In the design of the prior art, by using a BMC (Baseboard Management Controller) which is disposed in a server system, and making to-be-monitored BIOS chips electrically connect with a SPI (Serial Peripheral Interface) of the BMC, the purpose of monitoring whether the BIOS chips can proceed a normal POST is achieved. However, with the two BIOS chips electrically connected with the BMC at the same time, the following issue occurs: it is necessary to distinguish which BIOS chip from the two BIOS chips is able to be used for normal startup of the server system.

Therefore, a new server system is needed to solve the problem in the prior art.

SUMMARY OF THE INVENTION

In order to solve technical problem above, an objective of the present invention is to provide a server system which is able to achieve that when one BIOS chip from a first BIOS chip and a second BIOS chip fails to start, the server system will automatically start by the other BIOS chip; the safety and the reliability of the server system are ensured.

To achieve the above objective, the present invention provides a server system, comprising a first BIOS chip, a second BIOS chip, a BMC, and a platform controller. The BMC is electrically connected with a multiplexer, the multiplexer is electrically connected with the first BIOS chip and the second BIOS chip. The BMC is electrically connected with the first BIOS chip and the second BIOS chip. The platform controller is electrically connected with the BMC. In a preset mode, the platform controller is conductively connected with the first BIOS chip through the BMC and the multiplexer so that the server system is activated by the first BIOS chip. Upon detecting a failure of a POST initialization of the first BIOS chip, the BMC transmits a control command to the multiplexer so as to make the platform controller conductively connecting with the second BIOS chip through the BMC and the multiplexer so that the server system is activated by the second BIOS chip.

In one preferred embodiment, the platform controller is electrically connected with the BMC through an SPI.

In one preferred embodiment, the BMC comprises the SPI and a GPIO pin, a signal selecting pin of the SPI is electrically connected with a inputting pin of the multiplexer, the GPIO pin is electrically connected with a selecting pin of the multiplexer, a first outputting pin of the multiplexer is electrically connected with a CS pin of the first BIOS chip, a second outputting pin of the multiplexer is electrically connected with a CS pin of the second BIOS chip.

In one preferred embodiment, data pins of the SPI of the BMC are electrically connected with data pins of the first BIOS chip and data pins of the second BIOS chip. A clock pin of the SPI of the BMC is electrically connected with a clock pin of the first BIOS chip and a clock pin of the second BIOS chip.

In one preferred embodiment, the BMC sends a control command by the GPIO pin. In the preset mode, the multiplexer receives a selecting signal of the SPI and transmits the selecting signal to the first outputting pin, the first BIOS chip receives the selecting signal of the SPI outputted from the first outputting pin to enter into a working mode, and receives a data signal and a clock signal of the SPI transmitted by the BMC.

In one preferred embodiment, upon detecting a failure of the POST initialization of the first BIOS chip, the multiplexer transmits the selecting signal of the SPI to the second outputting pin according to the control command, which is transmitted by the BMC, the second BIOS chip receives the selecting signal of the SPI outputted from the second outputting pin to enter into a working mode, and receives the data signal and the clock signal of the SPI transmitted by the BMC.

In one preferred embodiment, the BMC comprises a register; the register is used to store failed records of POST initialization of the first BIOS chip and/or the second BIOS chip.

In one preferred embodiment, when the server system is in a standby mode, the BMC is considered as a main controller to proceeds an update process to the first BIOS chip and/or the second BIOS chip.

In one preferred embodiment, a remote method and/or a local method is applied to the BMC, to process a specific command of the BMC, and to process the update process to the first BIOS chip and/or the second BIOS chip.

In one preferred embodiment, a plurality of outputting pins of an SPI of the platform controller are electrically connected with a plurality of inputting pins of the first BIOS chip and a plurality of inputting pins of the second BIOS chip through a tunnel of the SPI of the BMC.

The advantage of the present invention is that it is able to achieve that when one BIOS chip from a first BIOS chip and a second BIOS chip fails to start, the server system will automatically start by another BIOS chip; the normal operation of the server system is not influenced, and the safety and the reliability of the server system are increased. Furthermore, the first BIOS chip and the second BIOS chip are controlled to achieve a function of backup by the GPIO pin of the BMC.

BRIEF DESCRIPTION OF THE DRAWINGS

FIG. 1 is a functional block diagram of a server system according to a preferred embodiment of the present invention.

DETAILED DESCRIPTION OF THE PREFERRED EMBODIMENTS

With reference to the accompanying drawings, which is used to exemplify specific embodiments of a server system which may be carried out in the present invention.

Refer to FIG. 1, a server system 100 of one preferred embodiment of the present invention is disclosed. The server system 100 comprises a first BIOS chip 140, a second BIOS chip 150, a BMC 120, and a platform controller 110. The BMC 120 is electrically connected with a multiplexer 130 which is electrically connected with the first BIOS chip 140 and the second BIOS chip 150. The BMC 120 is electrically connected with the first BIOS chip 140 and the second BIOS chip 150. The platform controller 110 is electrically connected with the BMC 120. In a preset mode, the platform controller 110 is conductively connected with the first BIOS chip 140 through the BMC 120 and the multiplexer 130 so that the server system 100 is activated by the first BIOS chip 140. Upon detecting a failure of a POST initialization of the first BIOS chip 140, the BMC 120 transmits a control command to the multiplexer 130 so as to make the platform controller 110 conductively connecting with the second BIOS chip 150 through the BMC 120 and the multiplexer 130 so that the server system 100 is activated by the second BIOS chip 150.

Specifically, the platform controller 110 is electrically connected with the BMC through a Serial Peripheral Interface (SPI); the SPI comprises a CS0# pin, a MOSI pin, a MISO pin, and a CLK pin. The CS0# pin is used to select a signal. The MOSI pin is used to login a serial data. The MISO pin is used to output the serial data. The CLK pin is used to output a clock signal. The CS0# pin, the MOSI pin, the MISO pin, and the CLK pin are electrically connected with the corresponding pins of the BMC 120, such as a SYSCS# pin, a SYSDO pin, a SYSDI pin, and a SYSCK pin, as shown in FIG. 1.

Furthermore, the BMC 120 comprises the SPI and a GPIO pin. A signal selecting pin (SPICS0#) of the SPI is electrically connected with a inputting pin (A) of the multiplexer 130, the GPIO pin (GPIOD1) is electrically connected with a selecting pin (SEL) of the multiplexer 130, a first outputting pin (B0) of the multiplexer 130 is electrically connected with a CS pin (CS#) of the first BIOS chip 140, a second outputting pin (B1) of the multiplexer 130 is electrically connected with a CS pin (CS#) of the second BIOS chip 150.

With reference of FIG. 1, data pins (SPIDO and SPIDI) of the SPI of the BMC 120 are electrically connected with data pins (MOSI pin and MISO pin) of the first BIOS chip 140 and data pins (MOSI and MISO) of the second BIOS chip 150. A clock pin (SPICK) of the SPI of the BMC 120 is electrically connected with a clock pin (CLK) of the first BIOS chip 140 and a clock pin (CLK) of the second BIOS chip 150.

The operation of the server system 100 will be described below.

In the embodiment, the BMC 120 sends a control command by the GPIO pin (GPIOD1). In the preset mode, the multiplexer 130 receives a selecting signal (the selecting signal is transmitted through SPICS0# pin) of the SPI and transmits the selecting signal to the first outputting pin (B0), the first BIOS chip 140 receives the selecting signal of the SPI outputted from the first outputting pin to enter into a working mode, and receives a data signal and a clock signal (the data signal is transmitted through a SPIDO pin and a SPIDI pin, the clock signal is transmitted through a SPICK) of the SPI transmitted by the BMC 120.

Upon detecting a failure of that the POST initialization of the first BIOS chip 140, the multiplexer 130 transmits the selecting signal of the SPI to the second outputting pin according to the control command, which is transmitted by the BMC 120. When the selecting pin (SEL) of the multiplexer 130 receives a low potential signal, the first outputting pin (B0) of the multiplexer 130 is conductively connected with the first inputting pin (A) of the multiplexer 130 according to a preset definition, as shown in FIG. 1. The B0 pin receives a selecting signal transmitted from the signal selecting pin of the SPI. When the selecting pin (SEL) of the multiplexer 130 receives a high potential signal, the second outputting pin (B1) of the multiplexer 130 is conductively connected with the second inputting pin (B) of the multiplexer 130 according to a preset definition, as shown in FIG. 1. The B1 pin receives a selecting signal transmitted from the signal selecting pin of the SPI. Please note that the preset definition of selecting pins are not limiting of the present invention; the definition can be changed according to the real circumstance. In the preset mode, the first BIOS chip 140 receives the selecting signal of the SPI outputted from the first outputting pin to enter into a working mode, and receives the data signal and the clock signal of the SPI transmitted by the BMC 120. When the POST initialization of the first BIOS chip 140 is failed, the selecting signal of the SPI is originally transmitted to the first outputting pin of the multiplexer 130, and then the selecting signal of the SPI is transmitted to the second outputting pin of the multiplexer 130. The second BIOS chip 150 receives the selecting signal of the SPI outputted from the second outputting pin to enter into a working mode, and receives the data signal and the clock signal (the data signal is transmitted through the SPIDO pin and the SPIDI pin, the clock signal is transmitted through the SPICK) of the SPI transmitted by the BMC 120. Hence, when the first BIOS chip 140 fails to start, the server system 100 is able to automatically switch to the second BIOS chip 150 for the startup. Of course, in the other embodiments of the present invention, when the second BIOS chip 150 fails to start, the server system 100 is able to automatically switch to the first BIOS chip 140 for the startup according to a preset setting. Hence, with comparison to the prior art, the present invention ensures that when any BIOS chip among a first BIOS chip 140 and a second BIOS chip 150 fails to start, is conducted with is able to automatically start by the other BIOS chip; the normal operation of the server system 100 is not influenced, and the reliability of the server system 100 are ensured.

In the embodiment, the BMC 120 comprises a register (not shown), the register being used to store failed records of POST initialization of the first BIOS chip 140 and/or the second BIOS chip 150 to determine which POST initialization of a BIOS chip among the first BIOS chip 140 and the second BIOS chip 150 is failed or which the BIOS chip among the first BIOS chip 140 and the second BIOS chip 150 is itself defected. A firmware of the BIOS chip which fails to start can be updated by a firmware of the BMC 120 to increase maintenance efficiency.

With further reference to FIG. 1, the first BIOS chip 140 and the second BIOS chip 150 are both electrically connected with the BMC 120, when the BMC 120 wants to update a firmware of any BIOS chip which fails to start among the first BIOS chip 140 and the second BIOS chip 150, it is necessary that the server system 100 is in a standby mode. The BMC 120 is considered as a main controller (master) to proceeds an update process to the first BIOS chip 140 and/or the second BIOS chip 150. The firmware of the first BIOS chip 140 and the second BIOS chip 150 are the same, and it is easy for the BMC 120 to replace the firmware of any BIOS chip which fails to start by the firmware of the BMC itself, thereby increasing maintenance efficiency.

In the embodiment, when the server system 100 is in the standby mode, a remote method and/or a local method is applied to the BMC to process a specific command (IPMI command) of the BMC 120, and to process the update process to any BIOS chip which fails to start among the first BIOS chip 140 and/or the second BIOS chip 150 through the multiplexer 130. In other embodiments, the update method is also suitable for updating the firmware of the first BIOS chip 140 and the second BIOS chip 150 which are under normal operation.

Please note that when starting the server system 100, a plurality of outputting pins (CS0#, MOSI, MOSO, CLK) of an SPI of the platform controller are electrically connected with a plurality of inputting pins (CS#, MOSI, MOSO, CLK) of the first BIOS chip 140 and a plurality of inputting pins (CS#, MOSI, MOSO, CLK) of the second BIOS chip 150 through a tunnel (the dashed line in the FIG. 1) of the SPI of the BMC 120, to achieve a function of direct communication of the SPI. Furthermore, an arrangement as mentioned above only makes small changes to an existing circuit layout, which reduces the cost of changing the circuit effectively.

The present invention is able to achieve that when the POST of any BIOS chip among the first BIOS chip 140 and the second BIOS chip 150 is failed, the server system 100 will automatically start by another BIOS chip; the normal operation of the server system is not influenced, and the safety and the reliability of the server system are increased. Furthermore, when the server system 100 is in the standby mode, a remote method and/or a local method is applied to the BMC to process a specific command (IPMI command) of the BMC 120, and to process the update process to the BIOS chip which fails to start among the first BIOS chip 140 and/or the second BIOS chip 150.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A server system, comprising:
a first BIOS (Basic Input/Output System) chip;
a second BIOS chip;
a BMC (Baseboard Management Controller) electrically connected with a multiplexer, the multiplexer being directly electrically connected with the first BIOS chip and the second BIOS chip, the BMC electrically being directly connected with the first BIOS chip and the second BIOS chip; and
a platform controller, electrically connected with the BMC;
wherein in a preset mode, the platform controller is conductively and indirectly connected with the first BIOS chip through the BMC and the multiplexer so that the server system is activated by the first BIOS chip; upon detecting a failure of a POST (Power-on self-test) initialization of the first BIOS chip, the BMC transmits a control command to the multiplexer so as to make the platform controller conductively connecting with the second BIOS chip through the BMC and the multiplexer so that the server system is activated by the second BIOS chip.

2. The server system according to claim 1, wherein the platform controller is electrically connected with the BMC through an SPI (Serial Peripheral Interface).

3. The server system according to claim 1, wherein the BMC comprises the SPI and a GPIO (General-purpose input/output) pin, a signal selecting pin of the SPI being electrically connected with a inputting pin of the multiplexer, the GPIO pin being electrically connected with a selecting pin of the multiplexer, a first outputting pin of the multiplexer being electrically connected with a CS (Chip Select) pin of the first BIOS chip, a second outputting pin of the multiplexer being electrically connected with a CS pin of the second BIOS chip.

4. The server system according to claim 1, wherein data pins of the SPI of the BMC are electrically connected with data pins of the first BIOS chip and data pins of the second BIOS chip, a clock pin of the SPI of the BMC is electrically connected with a clock pin of the first BIOS chip and a clock pin of the second BIOS chip.

5. The server system according to claim 1, wherein the BMC sends a control command by the GPIO pin, in the preset mode, the multiplexer receives a selecting signal of the SPI and transmits the selecting signal to the first outputting pin, the first BIOS chip receives the selecting signal of the SPI outputted from the first outputting pin to enter into a working mode, and receives a data signal and a clock signal of the SPI transmitted by the BMC.

6. The server system according to claim 1, wherein upon detecting a failure of the POST initialization of the first BIOS chip, the multiplexer transmits the selecting signal of the SPI to the second outputting pin according to the control command, which is transmitted by the BMC, the second BIOS chip receives the selecting signal of the SPI outputted from the second outputting pin to enter into a working mode, and receives the data signal and the clock signal of the SPI transmitted by the BMC.

7. The server system according to claim 1, wherein the BMC comprises a register configured to store the failure of POST initialization of the first BIOS chip or the second BIOS chip.

8. The server system according to claim 1, wherein when the server system is in a standby mode, the BMC is considered as a main controller to process an update process to the first BIOS chip and/or the second BIOS chip.

9. The server system according to claim 1, wherein remotely or locally controlling the BMC through a specific command is performed to update the first BIOS chip or the second BIOS chip.

10. The server system according to claim 1, wherein a plurality of outputting pins of an SPI of the platform controller are electrically connected with a plurality of inputting pins of the first BIOS chip and a plurality of inputting pins of the second BIOS chip through a tunnel of the SPI of the BMC.

* * * * *